May 19, 1925.

D. H. DEERY 1,538,177

LIGHT INDICATOR FOR AUTOMOBILE LAMPS

Original Filed March 29, 1924

INVENTOR.
DANIEL H. DEERY.
BY
ATTORNEY.

Patented May 19, 1925.

1,538,177

UNITED STATES PATENT OFFICE.

DANIEL H. DEERY, OF BRIDGEPORT, CONNECTICUT, ASSIGNOR TO THE D. & H. LAMP CO., OF BRIDGEPORT, CONNECTICUT, A COPARTNERSHIP COMPOSED OF DANIEL H. DEERY AND WILLIAM HENNESSEY, BOTH OF BRIDGEPORT, CONNECTICUT.

LIGHT INDICATOR FOR AUTOMOBILE LAMPS.

Original application filed March 29, 1924, Serial No. 702,891. Divided and this application filed November 5, 1924. Serial No. 747,976.

*To all whom it may concern:*

Be it known that I, DANIEL H. DEERY, a citizen of the United States, and a resident of the city of Bridgeport, in the county of Fairfield and State of Connecticut, have invented certain new and useful Improvements in Light Indicators for Automobile Lamps, of which the following is a specification, the present being a division of an application filed by me on March 29, 1924, Ser. No. 702,891.

The present invention relates to a light indicator for automobile lamps, and has for an object to provide a device of this character which will positively indicate to the driver whether or not his head-lamps are lighted, so that in the event that one of them goes out he may immediately replace or fix it, thereby protecting both himself and other motorists against the menace and danger of driving with only one lamp.

A further object is to provide a light indicating device disposed at the front of the lamp casing, and which will form no opaque or other obstruction to the forwardly directed light rays, the device being substantially invisible and transparent from the front, so that the function of the lens is neither impaired or obstructed. In the present embodiment it is proposed to provide the light indicating means in the form of a column of glass having a rearwardly directed light indicating surface, said column being integrally formed with or substantially homogeneously attached to the lens surface.

Other objects are to provide a device which cannot get out of order, will harmonize with any design of lamp, and will in no way detract from its appearance or normal function.

With the above and other objects in view, an embodiment of the invention is shown in the accompanying drawings, and this embodiment will be hereinafter more fully described with reference thereto, and the invention will be finally pointed out in the claims.

In the drawings.

Similar reference characters indicate corresponding parts throughout the several figures of the drawings.

Figure 1:
Fig. 1 is a view from the driver's seat of an automobile, at night, and showing the lighted head-lamps provided with light indicating means, according to the present invention.
Figure 2:
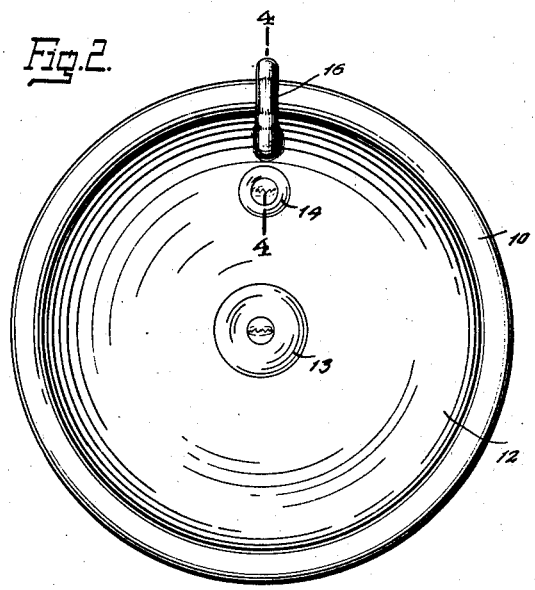
Fig. 2 is a front elevation of the lamp provided with the indicating means.
Figure 3:
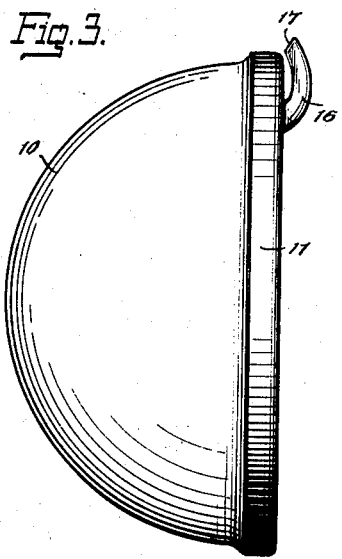
Fig. 3 is a side elevation thereof.

Referring to the drawings, the head-lamps shown therein, and which, with the exception of the lens, are of the usual type, comprise a main body or casing 10 having a circular flanged rim 11 secured thereon by bayonet joints or the like, and holding in place the circular lens 12; the lamp also having the usual bright and dim light bulbs 13 and 14 and a reflector 15.

The light indicating device, which according to my invention is formed as an integral or homogeneous part of the lens, is provided in both head lamps, to indicate at the rear by showing light spots above each lamp, and which are clearly visible to the driver, whether or not the lamps are lighted, it being immediately apparent to the driver when either one or both of them are out. This is clearly illustrated in Fig. 1.

The device, according to the present embodiment, comprises a curvilinear glass column 16 extending from the surface of the lens near its top edge and having a flat polished light indicating surface 17 at its upper end, adapted when the lens is in place in the lamp to be above the rim and faced rearwardly toward the driver. The face 17 is preferably in an inclined plane and forwardly and out of contact with the rim of the lamp. The column may be integrally formed with the lens by molding the same thereon during the molding of the lens, or it may be fused, cemented, or otherwise suitably attached to form a homogeneous or transparent jointure the term integral, in the claims, being employed as generic to such homogeneous or transparent connection between the lens and column.

Figure 4:
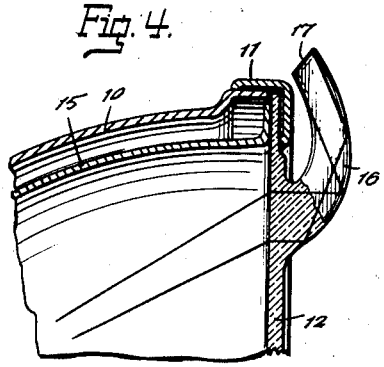
Fig. 4 is an enlarged vertical sectional view, partly in side elevation, and taken along the line 4—4 of Fig. 2.
Figure 5:
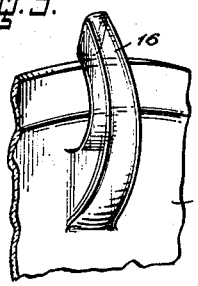
Fig. 5 is a perspective fragmentary view, from the front side, of the lens provided with the device, according to the present embodiment.
Figure 6:
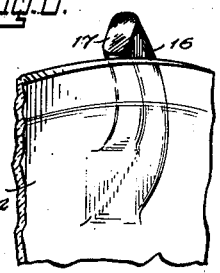
Fig. 6 is a similar view, from the rear side.

The outer curved wall of the column is preferably rounded in cross-section, so as to concentrate the light rays striking it and reflected by it, and its curvature is such that the light rays passing through the lens are reflected to the upper face 17 in intensified relation, as indicated by the light rays lines in Fig. 4, and a clear illuminated light spot is visible to the driver. The walls of the column being transparent there is no opaque or other obstruction to the normal light rays directed forwardly, and the lamp as viewed from the front, when lighted, presents its normal unobstructed appearance, the device being substantially invisible in front of the lamp.

It is obvious from the foregoing that the device according to my invention, as incorporated in the lamp lens, may be readily attached to any type of lamp, without necessitating any change therein, and provides a clear and positive indication to the driver as to whether or not his head lamps are lighted. It will be understood, of course, that the invention may be applied to other lamps, as tail-lamps, for the purpose of indicating whether or not they are lighted, and that it is not restricted to automobile use.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. As an article of manufacture, a lamp lens having an integral light indicator device consisting of a light conducting column extending from the front surface of said lens and having a light emitting end surface disposed outside the periphery of the lens and reversely to the front surface of the lens, said column being continuously curved between its ends.

2. In a lamp, including a casing and lens retaining rim, a lens having an integral light indicator device consisting of a transparent column of light conducting material extending from the front surface of the lens and having a light emitting end surface disposed outside the periphery of the rim and reversely to the direction of the normal light rays through said lens, said column being continuously curved between its ends and transparent as viewed from the front.

Signed at Bridgeport, in the county of Fairfield, and State of Connecticut, the 3rd day of November, 1924.

DANIEL H. DEERY.